United States Patent [19]
Ulrich et al.

[11] 3,870,717
[45] Mar. 11, 1975

[54] NEW VAT DYESTUFFS, THEIR MANUFACTURE AND USE

[75] Inventors: Paul Ulrich; Max Stäuble, both of Basel, Switzerland

[73] Assignee: Ciba-Geigy AG, Basel, Switzerland

[22] Filed: Feb. 28, 1973

[21] Appl. No.: 336,574

[30] Foreign Application Priority Data
Mar. 3, 1972 Switzerland............... 3133/72
Jan. 22, 1973 Switzerland............... 855/73

[52] U.S. Cl............. 260/249, 8/54.2, 8/162 B, 8/163, 8/178 E, 8/178 R, 8/180, 106/137, 106/148, 106/193 R, 260/37 N, 260/37 R, 260/240 B, 260/240 CA, 260/248 R, 260/249.5, 260/249.8

[51] Int. Cl.............................. C07d 55/20

[58] Field of Search .. 260/249, 262, 240 B, 240 CA

[56] References Cited
UNITED STATES PATENTS
3,684,808  8/1972  Ulrich ........................ 260/249
3,787,406  1/1974  Ulrich et al. ................. 260/249

Primary Examiner—John D. Randolph
Attorney, Agent, or Firm—Joseph G. Kolodny; Edward McC. Roberts; Prabodh I. Almaula

[57] ABSTRACT

The present invention relates to new vat dyestuffs of the general formula

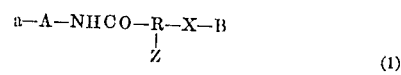

(1)

wherein A represents vattable polycyclic quinone, X represents oxygen or sulphur, B represents a 6-membered heterocycle with 2 to 3 nitrogen atoms which optionally contains further fused carbocyclic rings, R represents an aromatic radical at which the substituent —X—B is in ortho- or meta-position to the amide group, Z is hydrogen or —X—B, and a represents hydrogen or

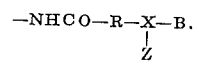

4 Claims, No Drawings

NEW VAT DYESTUFFS, THEIR MANUFACTURE AND USE

The present invention provides new vat dyestuffs of the general formula

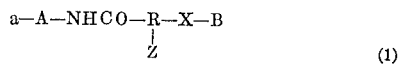  (1)

wherein A represents vattable polycyclic quinone, X represents oxygen or sulphur, B represents a 6-membered heterocycle with 2 to 3 nitrogen atoms which optionally contains further fused carbocyclic rings, R represents an aromatic radical at which the substituent —X—B is in ortho- or metaposition to the amide group, Z is hydrogen or —X—B, and a represents hydrogen or

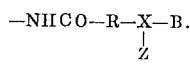

A special group of such dyestuffs comprises those of the formula

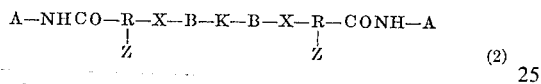  (2)

wherein K represents
—NH — aryl — NH—,
—X — aryl — aryl — X—,
—NH — aryl — N = N — aryl — NH—O—,
—O — aryl — N = N — aryl — O —,
—NH — aryl — CH = CH — aryl — NH—,
—O — aryl — CH = CH — aryl — O—,
—NH — anthraquinoyl — NH—,
and wherein A, B, R, Z and X have the same meanings as hereinbefore.

Preferably, B is the radical of a heterocyclic compound od the general formula

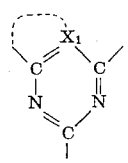  (3)

wherein $X_1$ represents the group

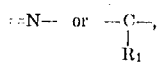

wherein $R_1$ represents a hydrogen atom or a substituent such as e.g. a halogen atom, a nitro, cyano, —COCl or alkyl group, such as e.g. the methyl group, or of the general formula

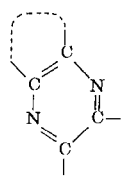  (4)

wherein the radicals of the formulae (3) and (4), as indicated by the broken line can contain a fused carbocyclic ring, preferably a benzene ring.

Suitable vattable radicals are radicals of polycyclic quinones, e.g. indanthrones, pyranthrones, dibenzanthrones, but chiefly of phthaloylacridones and, in particular, anthraquinones.

The aromatic radical R preferably represents a benzene or naphthalene radical. Preferred dyestuffs are those in which B is derived from a radical of the pyrimidine, pyridazine, quinazoline, quinoxaline, phthalazine or, in particular, of the 1,3,5-triazine series. These radicals B carry one or two of the following substitutents: halogen, alkyl, aryl, aryloxy, arylamino, —O—aryl—N=N—aryl, —NH—aryl—N=N—aryl, —O—aryl—CH=CH—aryl, —NH—aryl—aryl—CH=CH—aryl, —NH—$A_1$, —X—$A_1$, wherein X has the given meaning and $A_1$ is a vattable polycyclic quinone.

In this specification, the term "aryl radicals" is to be interpreted as meaning primarily phenyl, naphthyl or diphenyl radicals which are unsubstituted and substituted with chlorine, bromine, low molecular alkyl and alkoxy groups, and "halogen" denotes chlorine, bromine or fluorine.

These substituents occur chiefly in the following combinations:

a. Both substituents correspond to the formula —NH—$A_1$.

b. One substituent is a halogen atom, a low molecular alkyl group (i.e. containing up to 4 carbon atoms), or an aryl radical, and the other is a vattable radical $A_1$ which is bound through a —NH—, —O— or —S— bridge.

c. One substituent is a halogen atom, a low molecular alkyl group, an aryl radical or a radical of a vattable, polycyclic quinone $A_1$ which is bound through a —NH—, —O— or —S— bridge, and the other is a radical of the formula

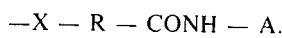

d. One substituent corresponds to the formula

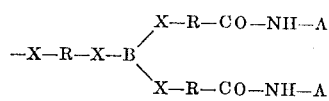

and the other is —X — R — CONH — A.

The substitution possibilities c) and d) only occur if a is a hydrogen atom, i.e. if the radical A possesses only one amino group which can be acylated with the acid chloride of an aromatic hydroxy or mercapto-carboxylic acid.

e. if the radical B is derived from a heterocyclic carboxylic acid or sulphic sulphonic chloride, then it can contain a vattable radical $A_1$ which is bound through an amide bridge instead of through an amino group. In this case the second substituent located at B is preferably a halogen atom.

Those compounds whose dyestuff molecule contains per triazine radical only one group or at most two groups, of the formula

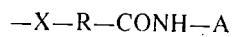

constitute products of particularly high tinctorial strength.

The symbol B thus represents preferably a 1,3,5-triazine radical of the formula

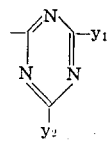

wherein
a. $y_1$ = —NH—$A_1$ or —X—$A_1$ $y_2 = -NH-A_1$ or $-X-A_1$ b. $y_1$ = halogen, low molecular alkyl, aryl, aryloxy, arylamino, phenylazophenylamino, phenylazophenyloxy, stilbenyloxy, stilbenylamino
$y_2 = -X-A_1$
$-NH-A_1$;

c. $y_1$ = halogen,
$-NH-A_1$ or $-X-A_1$,
$y_2 = -X-R-CONH-A$;

d. $y_1 = -X-R-CONH-A$

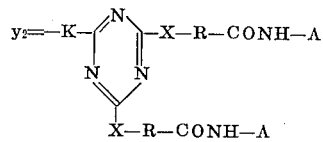

and wherein $A, A_1 K, X$ and $R$ have the meanings given in the formulae (1) and (2) the possibilities expressed under c) and d) only occur if in formula (1) a represents hydrogen.

Furthermore, B can be a radical of the formula

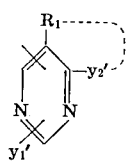

wherein $R_1$ represents hydrogen, halogen, low molecular alkyl, aryl, nitro or cyano, and 9. $y_1$ and $y_2 = -X-R-Co-NH-A$
b. $y_1$ = halogen
$y_2 = -CO-NH-A_1$ or

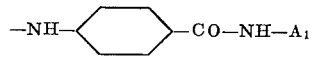

or wherein $R_1$ and $y_2'$ together represent a benzene ring which is optionally substituted with a group of the formula $-CO-NH-A_1$ and $y_1$ is halogen, low molecular alkyl, aryl, arylamino, $-NH-A_1$ or $-X-A_1$. Examples of such dyestuffs are:

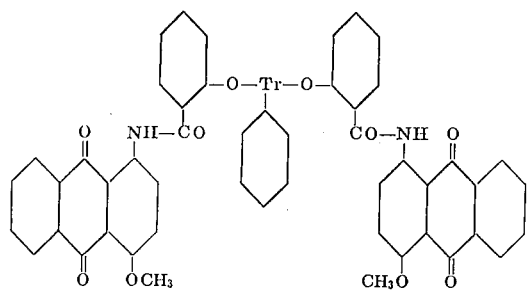

wherein $-\underset{|}{Tr}-$ represents the radical of the formula

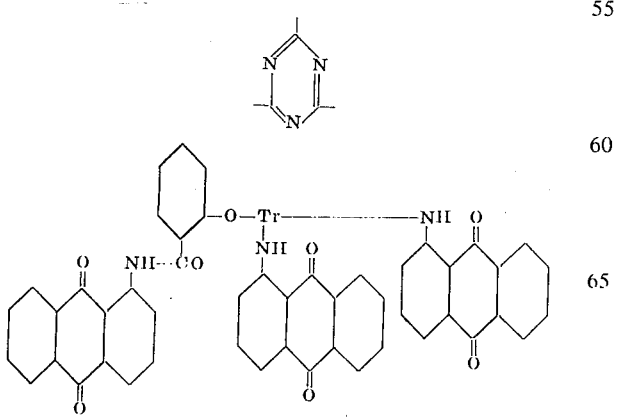

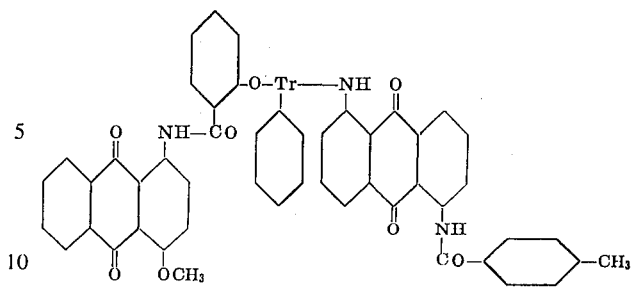

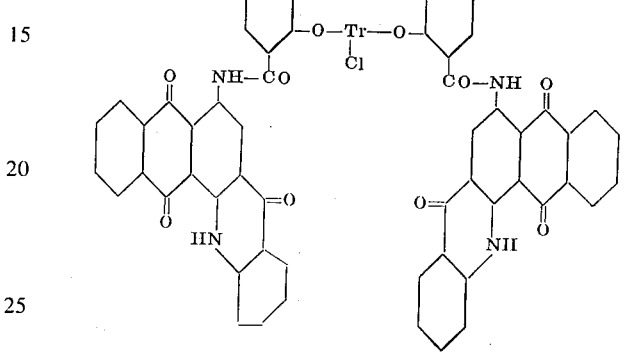

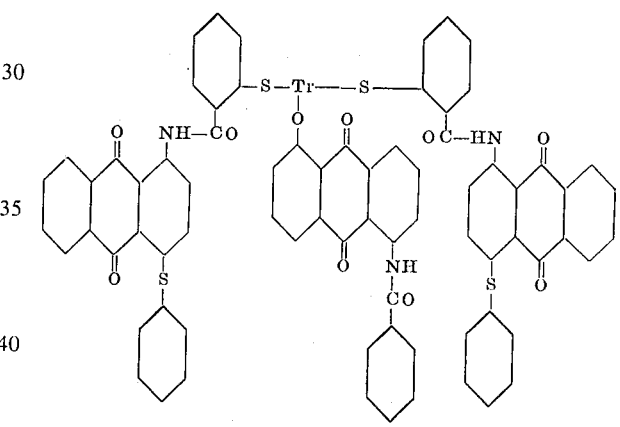

Further dyestuffs wherein A and $A_1$ represent vattable polycyclic quinone radicals are:

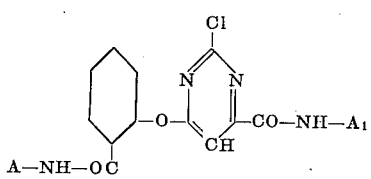

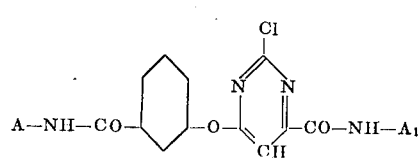

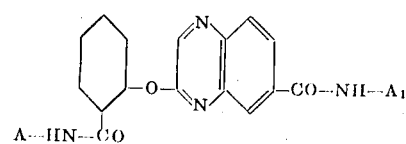

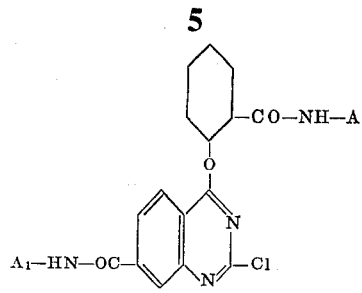

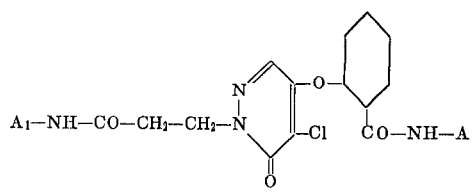

Particularly preferred dyestuffs on account of their interesting shades are those which contain at least two different vattable radicals, e.g. compounds of the above formulae wherein A and $A_1$ are different radicals.

Two reactive components, for example 2 triazine rings, can also be linked by bifunctional compounds, such as diamines and dihydroxy compounds, as in the following formulae:

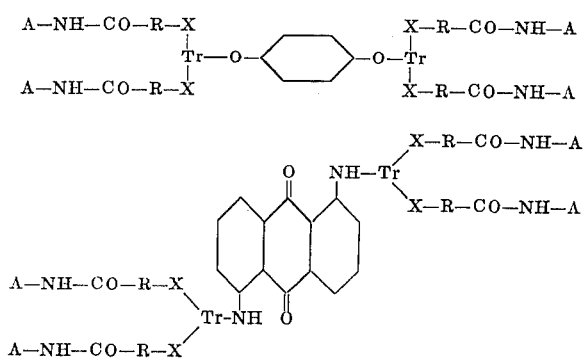

Further bridge members of this kind are e.g.:

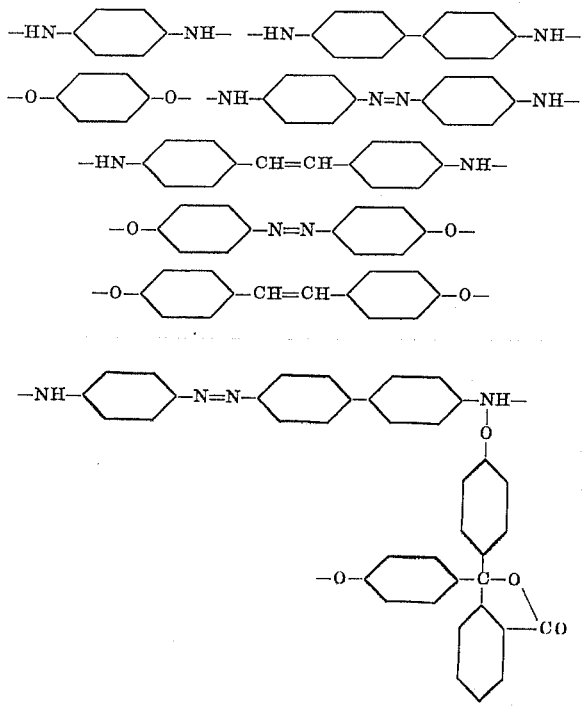

The dyestuffs of the formula (1) are manufactured by condensing a compound of the formula

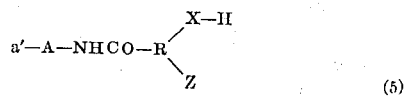

wherein, A, R and X have the same meanings as hereinbefore, $a'$ represents hydrogen or a radical of the formula

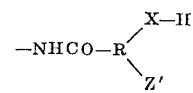

and $Z'$ represents hydrogen or —XH, with a colourless or coloured heterocyclic reactive component of the formula

wherein B has the given meaning and $Y_1$, $Y_2$ and $Y_3$ are substituents of which at least one is an reasily removable radical, e.g. a halogen atom, preferably chlorine or bromine, or a methylsulphonyl group.

To manufacture dyestuffs of the formula (2), a start is made from a reactive component of the formula

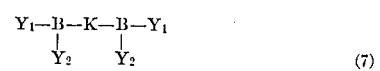

wherein K has the given meaning and B, $Y_1$ and $Y_2$ have the same meanings as hereinbefore.

Furthermore, one or two of the substituents $Y_1$, $Y_2$ and $Y_3$ can be an aromatic radical which is bound through a —NH—, —O— or —S— bridge, e.g. an aryloxy or arylamino radical or a group of the formula —NH—$A_1$, —X—$A_1$ or —CO—NH—$A_1$. These substituents are also introduced by condensation, by reacting the component B, which contains two to three reactive groups, e.g. halogen atoms or also an acid chloride group, with the corresponding amino, hydroxy or mercapto compounds. Preferably, these substituents are introduced into the radical B before the condensation with the atomatic hydroxy or mercapto compound of the formula (5). But it is also possible to do this afterwards. Thus, for examle 2,4,6-trichloro-1,3,5-triazine can be reacted firstly with one or two equivalents of the compound of the formula (5) and the resulting product subsequently condensed with two moles or 1 mole of a vattable quinone which contains amino groups, e.g. of a 1-amino-anthraquinone.

The process can also be carried out in such a way that triazines or pyrimidines which contain removable substituents, e.g. halotriazines, are reacted with a hydroxy or mercapto compound in the ratio 1:1 and, upon subsequent replacement of two removable substituents of the triazine or pyrimidine by amino groups, condensed with polycyclic, vattable aromatic compounds which contain removable substituents, e.g. haloanthraquinones. It is possible to obtain valuable compound shades by combining two different vattable compounds.

In accordance with the general formulae (5), (6) and (7), it is possible to vary at will the ratios in which the the hydroxy or mercapto compound (5) is combined with the reactive component (6) or (7) within the limits 4:1, 3:1, 2:1, 1:1, 1:2, 1:3 and 1:4. The ratio is preferably so chosen that the dyestuff molecule contains per heterocyclic radical B only one radical, or at the most two radicals, of the formula —X—R—CONH—A.

The condensation reactions are expediently carried out in an inert solvent and in the presence of an acid binding agent, e.g. sodium carbonate, sodium acetate, dimethyl formamide or, with advantage, of a tertiary amine, preferably pyridine.

According to their nature, suitable media for the reaction are aqueous systems (e.g. water/acetone) or organic solvents, such as nitrobenzene, di- or trichlorobenzenes, dimethyl aniline, N-methylpyrrolidone, pyridine etc. or possibly phenol.

If 2,4,6-trichloro-1,3,5-triazine is used as heterocyclic compound, the process is advantageously carried out in a high boiling solvent, for examle nitrobenzene, o-dichlorobenzene, naphthalene or phenol, since the third substituent of the triazine radical is relatively difficult to replace. It is advantageous to choose temperatures of over 100°C. The replacement of the third substituent in the triazine ring can also be facilitated by the addition of small amounts of an aromatic sulphonic acid, such as benzenesulphonic, p-toluenesulphonic or, especially, m-nitrobenzenesulphonic acid.

It can be of advantage if from time to time, or during the entire duration of the reaction, a stream of air or nitrogen is passed through the reaction mixture. The dyestuffs according to the invention can also contain sulpho groups. On occasion, products which have better affinity for the fibres are obtained if dyestuffs which are free from sulpho groups are subsequently sulphonated by one of the conventional processes.

The reactive components of the formulae (6) or (7) are derived from the pyridazine, quinazoline, quinoxaline, phthalazine or, preferably, from the pyrimidine or 1,3,5-triazine series.

The suitable compounds of the triazine series correspond preferably to the formula

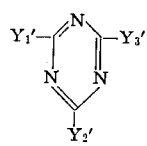

wherein
a. $Y_1'$ is a halogen atom and $Y_2'$ and $Y_3'$ are each radicals of the formula —X—$A_1$ or —NH—$A_1$ or
b. $Y_1'$ is a halogen atom, $Y_2'$ is a low molecular alkyl radical, an aryl, aryloxy, arylamino radical, the radical of a hydroxyazo or aminoazo compound or of a hydroxy- or aminostilbene, and $Y_3'$ is a radical of the formula —X—$A_1$ or —NH—$A_1$, or
c. $Y_1'$ and $Y_2'$ are halogen atoms, and $Y_3'$ is a low molecular alkyl, aryl, aryloxy or arylamino radical or the radical of an amino- or hydroxyazo compound, of an amino- or hydroxystilbene, or is a radical of the formula —NH—$A_1$ or —X—$A_1$, or
d. $Y_1'$ and $Y_2'$ are halogen atoms and $Y_3'$ is a radical of the formula

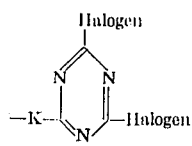

or
e. $Y_1'$, and $Y_3'$ are halogen atoms and X, $A_1$ and K have the same meanings as hereinbefore.

Examples of such compounds are 2,4,6-trichloro-1,3,5-triazine and 2,4,6-tribromo-1,3,5-triazine, 2,4,6-trimethane-sulphonyl-1,3,5-triazine, 4,6-dichloro-1,3,5-triazines which are substituted in 2-position by an aryl or alkyl radical, e.g. a phenyl, methyl or ethyl radical, or by the radical of an aliphatic or aromatic mercapto compound which is bound through the sulphur atom or of an aliphatic or aromatic hydroxyl compound which is bound through the oxygen atom or, in particular, by the radical of an aromatic amino compound which is bound through the nitrogen atom, e.g. an aminoanthraquinone.

Further examples of such reactive components are the compounds of the following formulae, wherein the symbol Tr always represents a 1,3,5-triazinyl radical:

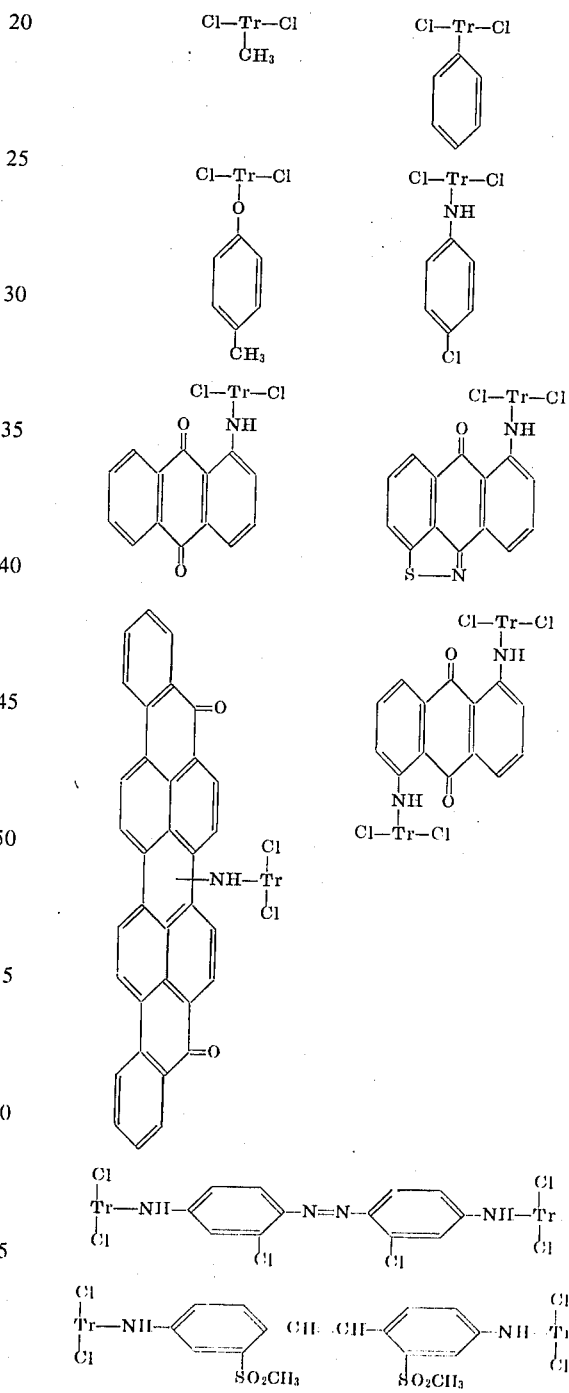

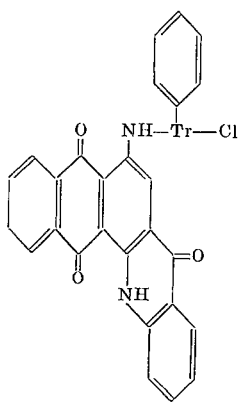

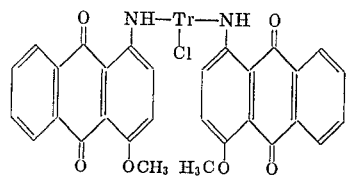

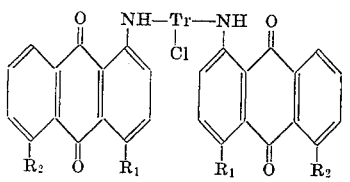

wherein $R_1$ and $R_2$ are hydrogen, benzoylamino, or phenylmercapto radicals, and

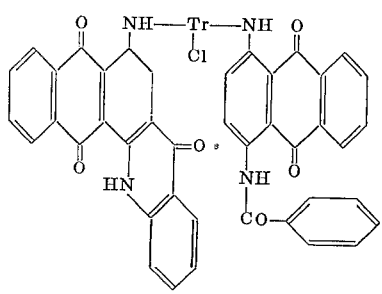

Examples of reactive components of the quinazoline and pyrimidine series are:

2,4-dichloroquinazoline and its derivatives, which instead of the one chlorine atom carry an aromatic radical which is bound through an amino bridge, e.g. an anilido group or the radical of an aminoanthraquinone; monochloroquinazolines, which carry in 2-position an aryl (e.g. phenyl, toluyl, diphenyl) or low molecular alkyl radical; 2,4,6-trichloro- or 2,4,6-tribromopyrimidine and derivatives thereof, which e.g. in 5-position carry a cyano, nitro, methyl, ethyl, carbamide, sulphamide, carbomethoxy, carbalkoxy, acyl (e.g. benzoyl, acetyl or propionyl), alkenyl (e.g. allyl or chlorovinyl) group, or a substituted alkyl (e.g. carboxymethyl, chloromethyl or bromomethyl) group, 2,4,5,6-tetrachloro- or 2,4,5,6-tetrabromopyrimidine
2,6-dichloro- or 2,6-dibromo-4-carboethoxypyrimidine
2,4,5-trichloropyrimidine 5-nitro-6-methyl-2,4-dichloropyrimidine
2,4-dichloropyrimidine-5-sulphonic acid
2,4-dichloro-5chloromethyl-6-methyl-pyrimidine
2,4-dibromo-5-bromomethyl-6-methylpyrimidine
2,4-dichloro-5-chloromethylpyrimidine
2,4-dibromo-5-bromomethylpyrimidine
2,5,6-trichloro-4-methylpyrimidine
2,6-dichloro-4-trichloromethylpyrimidine, or in particular
2-methanesulphonyl-4,5-dichloro-6-methylpyrimidine
2,4-dimethanesulphonyl-5-chloro-6-methylpyrimidine, and in particular the reaction products of
2,6-dichloropyrimidine-4- or 5-carboxylic acid chloride
2,6-dichloropyrimidine-4- or 5-sulphonic acid chloride
2,6-dibromopyrimidine-4- or 5-carboxylic acid or sulphonic acid chloride
2,4-dichloroquinazolinecarboxylic acid or sulphonic acid chloride with aromatic, preferably vattable amino compounds.

Suitable compounds of the quinazoline and pyrimidine series correspond preferably to the formula

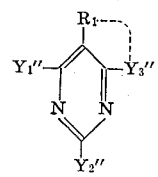

wherein $R_1$ is hydrogen, a halogen atom, in particular chlorine, a cyano, nitro or low molecular alkyl group or an aryl radical. The substituents $Y_1''$, $Y_2''$ and $Y_3''$ are either all halogen atoms, in particular chlorine, or one of them is a radical of the
formula

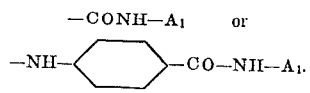

Moreover, $R_1$ with $Y_3''$ are able to form together a fused, preferably aromatic, ring, e.g. a benzene ring, which can be unsubstituted or which carries a radical of the formula $-CO-NH-A_1$. In this case, one of the radicals $Y_1''$ and $Y_2''$ is a halogen atom and the other is halogen, low molecular alkyl, aryl, arylamino, $-NH-A_1$ or $-X-A_1$. Examples of such reactive components are:

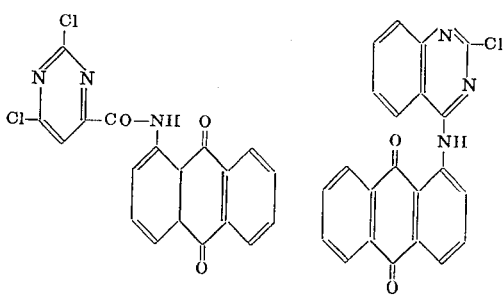

The anthraquinonyl radical can be substituted or replaced by another vattable radical, in particular by a 3,4-phthaloylacridone radical

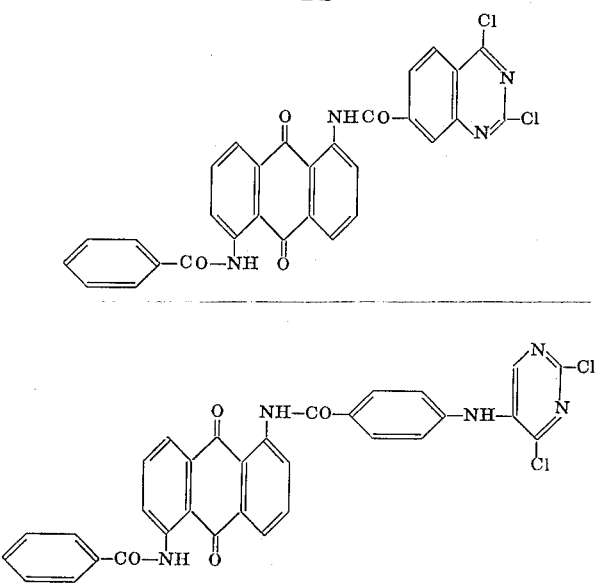

Suitable reactive components of the pyridazine, quinoxaline or phthalazine seres are e.g. 3,6-dichloropyridazine, tetrachloropyridazine, or the reaction products of acid chlorides of these series, such as 3,6-dichloropyridazine-5-carboxylic acid chloride
4,5-dichloropyridazon-(6)-yl-propionic acid chloride
4,5-dichloro-1-phenylpyridazone-carboxylic acid or sulphonic acid chloride
4,5-dichloropyridazone-propionic acid chloride
1,4-dichlorophthalazine-carboxylic acid or sulphonic acid chloride
2,3-dichloroquinoxaline-carboxylic acid or sulphonic acid chloride, with aromatic vattable amines.

Suitable vattable radicals for the groups A and $A_1$ are radicals of vattable polycyclic quinones.

The term vattable quinone comprises those chromophores which may be converted by reduction by reduction into a so-called leuco-form or vat which has a better affinity for natural or regenerated cellulose fibres than the non-reduced form, and which can be reconverted by oxidation into the original chromophoric system. Thus no polycyclic quinones of the type of 1-amino-4-arylaminoanthraquinone-2-sulphonic acid are used in the present process, because although these can be reduced, they are so strongly modified chemically by the reduction that they can no longer be converted into the original chromophoric system. As examples of vattable polycyclic quinones the following may be mentioned: perylenetetracarboxylic acid imides, especially the phenylimides, anthrapyrimidines, anthrapyridones, isothiazoleanthrones, quinazolineanthraquinones, oxazoleanthraquinones, thiazolanthraquinones, oxidiazoleanthraquinones, anthraquinonyltriazoles, pyrazoleanthraquinones, dipyrazoleanthronyls, pyrazinoanthraquinones, azabenzanthrones, indanthrones, thioxanthonanthraquinones, anthrimides, anthrimidecarbazoles, dihydroacridines, anthanthrones, pyranthrones, dibenzpyrenequinones, dibenzanthrones, isodibenzanthrones, flavanthrones, acedianthrones and especially anthraquinoneacridones and the anthraquinones themselves, whereby there are to be understood not only derivatives having pure 9,10-dioxoanthracene rings, but also those having thiophanthrone radicals and the like, as well as anthraquinone compounds having 9,10-dioxoanthracene rings. Preferred radicals are the - -phthaloylacridones bound in 2- or 8-position and anthraquinones bound in 1- or 2-position. All these radicals can carry the customary substituents for vat dyes. Examples of such substituents are: halogen atoms, especially chlorine, fluorine or bromine, alkyl, alkoxy, aryl, aryloxy, aralkyl, aralkoxy, carbalkoxy, arylamino, alkylmercapto, arylmercapto, cyano and thiocyano groups. By alkyl radicals are meant in particular radicals with 1 to 4 carbon atoms; by aryl radicals are meant in particular radicals sch as phenyl, toluyl, chlorophenyl, methoxyphenyl or naphthal radicals; and arylkyl means in particular the benzyl radical. Particularly important substituents are furthermore the acyl and the acylamino group. The term "acyl" comprises chiefly radicals of low molecular alkanecarboxylic or sulphonic acids, as well as radicals of carboxylic or sulphonic acids of the benzene series, it being possible for the benzene nucleus to be unsubstituted with halogen, low molecular alkyl or alkoxy radicals, or with aryl radicals, Moreover, the term acyl also comprises radicals of low molecular alkylcarbonic acid monoesters or sulphuric acid or carbonic monoamides. Example of such acyl and acylamino radicals are: benzoyl, p-chlorobenzoyl, p-phenylbenzoyl, benzenesulphonyl, toluenesulphonyl, acetyl, acetylamino, ethoxycarbonyl, ethoxycarbonylamino, sulphonamide and carboxylic acid amide groups which are unsubstituted or substituted with low molecular alkyl, aralkyl or aryl radicals, ureido radicals and alkylated ureido groups, such as $NH_2 - CO - NH -$ or $(CH_3)_2N - CO - NH -$.

The starting product of the formula (5) required for the process according to the invention is obtained by reaction of an aromatic hydroxy- or mercaptocarboxylic acid chloride with amino compounds of the cited vattable quinones. As examples of suitable starting compounds of the formula $A - NH_2$ or $A_1NH_2$ there may be cited:

1aminoanthraquinone
1-amino-4methoxyanthraquinone
1-amino-4acetylaminoanthraquinone
1-amino-4-benzoylaminoanthraquinone
1-amino-4-(p-toluensulphonylamino)-anthraquinone
1-amino-4-(p-chlorobenzoylamino)-anthraquinone
1-amino-4-anilidoanthraquinone
1-amino-4-[p-(N,N-dimethylsulphamido)-benzoylamino]-anthraquinone
1-amino-4-phenylmercaptoanthraquinone
1-amino-4-(4'40 -phenyl-benzoylamino)-anthraquinone and the corresponding 1-aminoanthraquinones which are substituted in 5- or 8-position instead of in 4-position, also
1,4-diaminoanthraquinone
1-amino-2-chloroanthraquinone
1-amino-3-chloroanthraquinone
1-amino-5-chloroanthraquinone
2-amino-4-chloroanthraquinone
1-amino-4-chloroanthraquinone
1-amino-6-chloroanthraquinone
1-amino-8-chloroanthraquinone
1-amino-3-chloro-6-methylanthraquinone
1-amino-6,7-dichloroanthraquinone
2-amino-3,4-phthaloylacridone
1,4-diamino-2-acetylaminoanthraquinone, aminoanthrapyrimidine,
1aroylamino-4- or -5-aminoanthraquinone,
1,4-diamino-2-acetylanthraquinone,
1-amino-7chloroanthraquinone,
1-amino-2-methyl-3-chloroanthraquinone, 4-aminoanthraquinone-2,1(N)-acridones,
4,4'-, 4,5'- or 5,5'-diamino-1,1'-dianthrimidecarbazole,
aminopyranthrones,
mono- and di-aminoacedianthrone,
aminoisodibenzanthrone,
aminodibenzanthrone,
aminoanthanthrone,
aminoflavanthrone,
aminopyranthrone,
4-, 5- or 8-amino-1,1'dianthrimide-carbazole,
4- or 5-amino-5'-benzoylamino-dianthrimidecarbazole,
4-amino-4'-benzoylamino-dianthrimide-carbazole,
aminodibenzpyrenequinone, and also mono- and diaminotrianthrimidecarbazoles,
for example 8',8"-diamino-1',1,4,1"'-trianthrimidecarbazole, and also perylenetetracarboxylic acid di-(p- or m-aminophenyl)-amide, the compounds of the formula

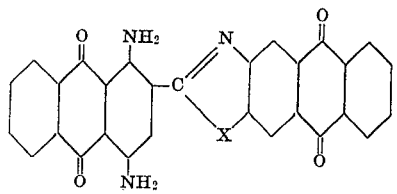

and

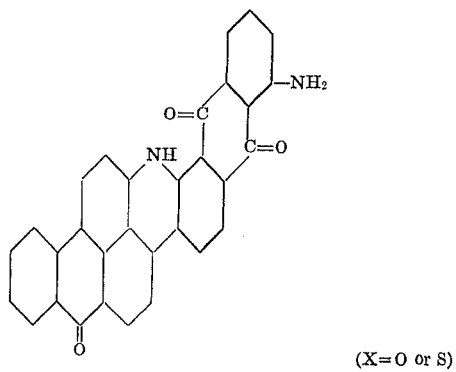

(X=O or S)

and those of the formula

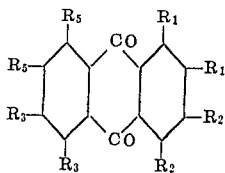

wherein one of the symbols $R_1$ represents a hydrogen atom and the other represents a grouping of the formula $$+NH-CO-R_4 \rightarrow_{n-1} -NH_2$$

n = 1 or 2,
one of the symbols $R_2$, $R_3$ and $R_5$ represents a halogen atom, an alkoxy, aryloxy, arylmercapto or acylamino group, especially a benzoylamino group, for example a chloro-, methyl-, sulpho- or fluoro-benzoylamino group or the unsubstituted $C_6H_5$—CO— group itself, and the other symbol $R_2$, $R_3$ or $R_5$ represents a hydrogen or halogen atom, one of the pairs of symbols $R_2R_2$, $R_3R_3$ or $R_5R_5$ being able to represent a grouping

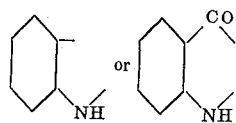

and $R_4$ denotes an arylene residue, preferably of the benzene series.

Suitable carboxylic acid chlorides of aromatic hydroxy or mercapto compounds are derived preferably from carboxylic acids of the benzene or naphthalene series. In addition to the hydroxy or mercapto groups they can contain further substituents, e.g. halogen atoms, low molecular alkyl, aralkyl, in particular benzyl, aryl, in particular phenyl, aryloxy, acyl or acylamino. Examples of such carboxylic acids are:
salicyclic acid
thiosalicyclic acid
2-hydroxy-5-chlorobenzoic acid
2-hydroxy-3-methyl-benzoic acid
2-hydroxy-4,5- or 6-methyl-benzoic acid
2,4-dihydroxy-benzoic acid
2,5-dihydroxy-benzoic acid
3-hydroxybenzoic acid
1-hydroxybenzoic acid
1-hydroxy-2-naphthalenecarboxylic acid
3-hydroxy-2-naphthalenecarboxylic acid
or compounds of the formulae

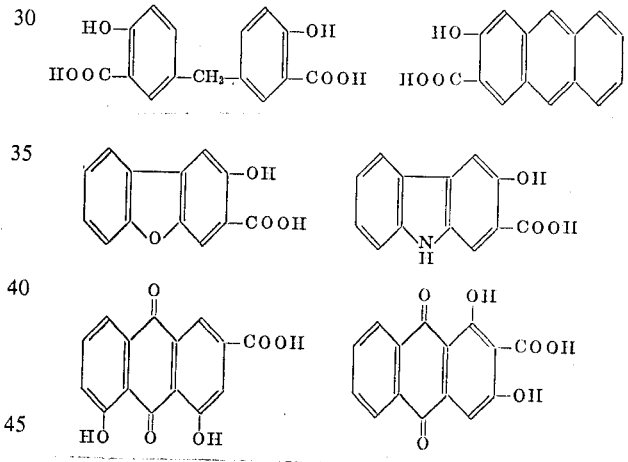

The dyeings obtained with the dyestuffs according to the invention are distinguished by brilliant, clear shades. The advantageous application properties are to be particularly highlighted. According to the present process, there are obtained, inter alia, dyestuffs whose application is very largely independent of temperature. The application can be carried out according to processes of the most diverse kinds, such as the exhaust or pad-dyeing process, for example the pad-jig process, the pad-steam or the cold padbatch process. Also noteworthy is that good dyestuff yields are obtained in all application processes, and that it is possible to synthesise the bulk of the dyestuffs in almost theoretical yield by the manufacturing process according to the invention. It is a particular advantage that the range of colour shades is very great, so that using the compounds according to the invention practically all shades can be produced.

The products obtained according to the process of the invention are suitable for dyeing and printing a wide variety of materials, in particular for dyeing and printing fibres of natural and regenerated cellulose in the presence of reducing agents, for example dithionite. The dyeings obtained are distinguished by very good fastness to wet processing, in particular fastness to boiling soda and fastness to chlorine, also by good to very good fastness to light.

The new dyestuffs may also be used as pigments. Due to their advantageous properties they may be used for the most varied pigment applications, for example in finely divided form for dyeing rayon and viscose rayon, or cellulose ethers or esters, or superpolyamides and superpolyurethanes or polyesters in the melt. They may also be used for manufacturing pigmented lacquers or lake formers, solutions or products of acetyl cellulose, nitrocellulose, natural resins or synthetic resins, such as polymerisation resins or condensation resins, for example aminoplasts, alkyd resins, phenolic plastics, polyolefines, such as polystyrene, polyvinyl chloride, polyethylene, polypropylene, polyacryonitrile, rubber, casein, silicone and silicone resins. Moreover, the new dyestuffs may be advantageously used in the manufacture of coloured pencils, cosmetic preparations or laminated sheets.

The following Examples illustrate the invention, the parts and percentages being by weight unless otherwise stated, and the symbol

represents the radical of the formula

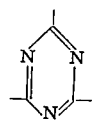

EXAMPLE 1

While stirring, 5.6 parts of the reaction product of 1 mole of cyanuric chloride and 1 mole of 1-aminoanthraquinone are heated to 205° to 210° in 80 parts of nitrobenzene together with 3.5 parts of salicyloylaminoanthraquinone in the presence of 0.3 part of pyridine. The reaction mixture is kept for 12 hours at this temperature, during which time a flow of nitrogen is passed in continually or from time to time. The mixture is then allowed to cool, the insoluble dyestuff is isolated by filtration, the filter product is washed with nitrobenzene and subsequently with methanol and dried in vacuum. The resulting dyestuff corresponds to the formula

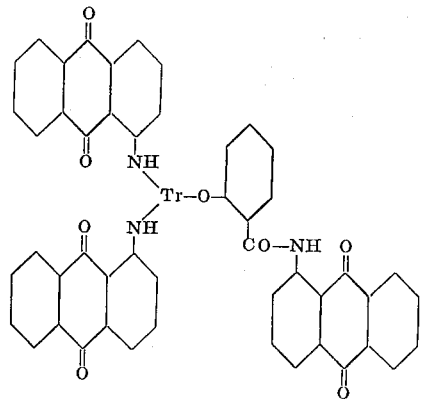

and dyes cotton in the conventional vat dyeing process in deep yellow shades of good fastness properties.

EXAMPLE 2

1.85 parts of the reaction product of 1 mole of cyanuric chloride and 1 mole of 1-aminoanthraquinone are heated to the boil for 45 minutes in 60 parts of nitrobenzene together with 3.5 parts of salicycoylaminoanthraquinone in the presence of 0.2 part of pyridine.

The mixture is allowed to cool to room temperature and then processed as described in Example 1. The isolated dyestuff of the formula

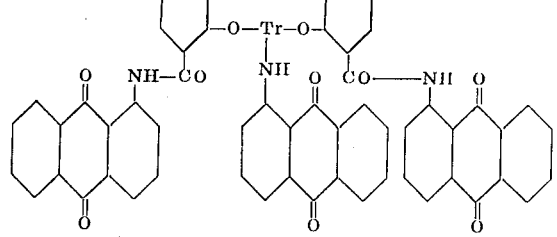

dyes cotton, linen or regenerated cellulose in the conventional vat dyeing process in deep golden yellow shades. From the starting materials listed in the following Table it is possible to manufacture by the process according to the invention further dyestuffs of the shade indicated in the final column.

| Example | Reactive component | Hydroxy or mercapto compound | Shade |
|---|---|---|---|
| 3 | (structure) | (structure) | Reddish orange. |

| Example | Reactive component | Hydroxy or mercapto compound | Shade |
|---|---|---|---|
| 4 | 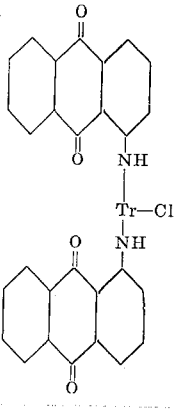 | 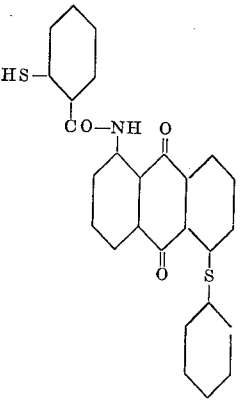 | Reddish orange. |
| 5 | 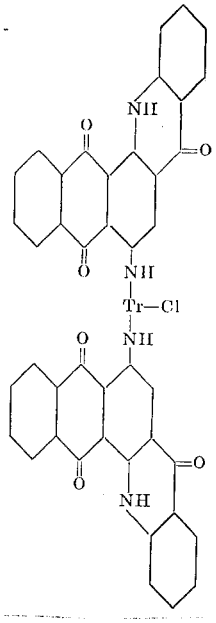 | 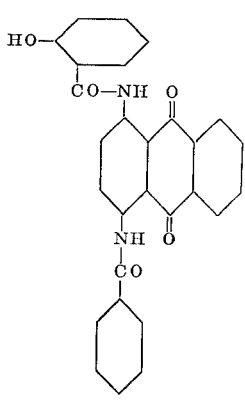 | Grey. |
| 6 | 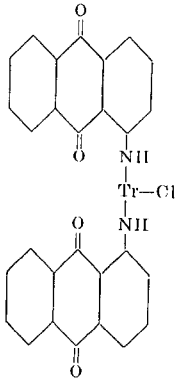 | 2 mol 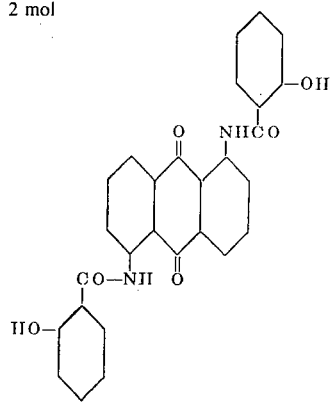 | Yellow. |

| Example | Reactive component | Hydroxy or mercapto compound | Shade |
|---|---|---|---|
| 7 | Cl–Tr–Cl (Cl) | 2 mol 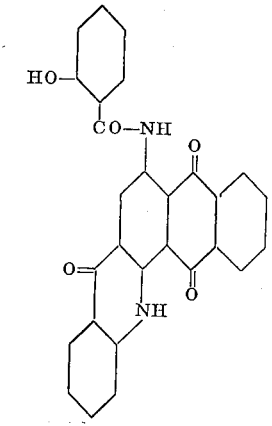 | Blue. |
| 8 | 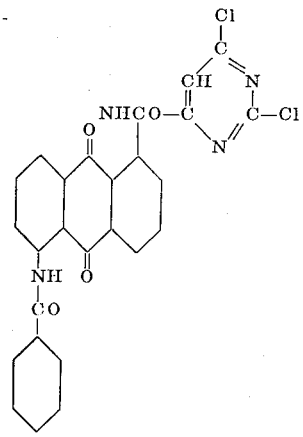 | 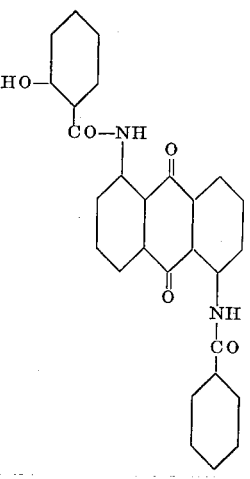 | Yellow. |
| 9 | 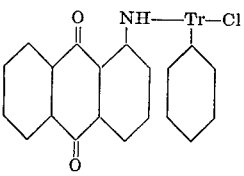 | 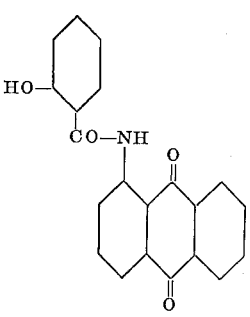 | Do. |
| 10 | 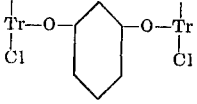 | 4 mol 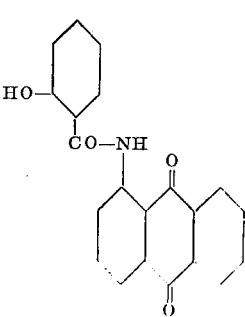 | Do. |

-Continued
| Example | Reactive component | Hydroxy or mercapto compound | Shade |
|---|---|---|---|
| 11 | 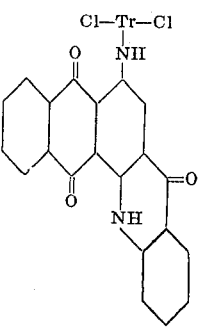 | 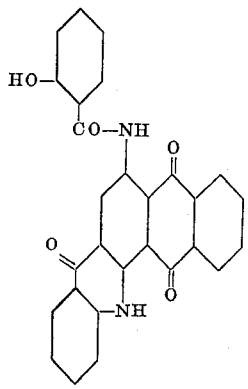 | Blue. |
| 12 | 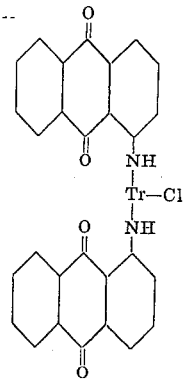 | 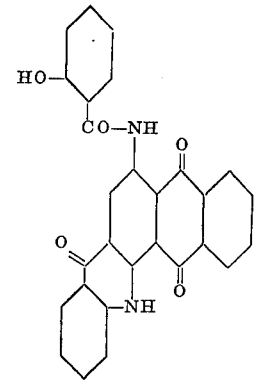 | Green. |
| 13 | 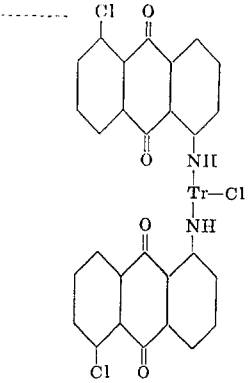 | 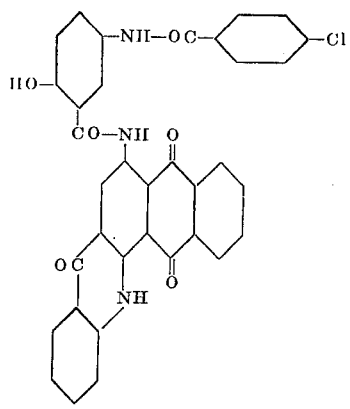 | Olive green. |
| 14 | 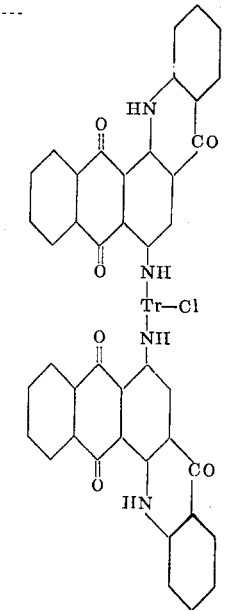 | 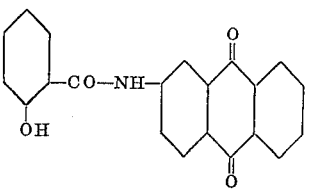 | Greenish olive. |

| Example | Reactive component | Hydroxy or mercapto compound | Shade |
|---|---|---|---|
| 15 | [anthraquinone structure with HN-CO linkages, Tr-Cl bridge connecting two anthraquinone units] | [mercapto compound: SH-cyclohexyl-CO-NH-anthraquinone] | Bluish green. |
| 16 | [dichloro-anthraquinone structure with NH-Tr-Cl-NH bridge connecting two chloroanthraquinone units] | [SH-cyclohexyl-CO-NH-anthraquinone] | Yellow. |
| 17 | [anthraquinone with HN-CO and NH-Tr-Cl-Cl substituents] | 2 mol [anthraquinone-HN-OC-cyclohexyl-OH] | Green. |
| 18 | [bis(benzamido-anthraquinone) linked via NH-Tr-Cl-NH bridge] | [HO-cyclohexyl-CO-NH-chloroanthraquinone] | Golden yellow. |

—Continued

| Example | Reactive component | Hydroxy or mercapto compound | Shade |
|---|---|---|---|
| 19 | (structure) | (structure) | Yellow. |
| 20 | (structure) | (structure) | Golden yellow. |
| 21 | (structure) | (structure) | Bluish green. |
| 22 | Same as above | (structure) | Greenish blue. |

—Continued

| Example | Reactive component | Hydroxy or mercapto compound | Shade |
|---|---|---|---|
| 23 | 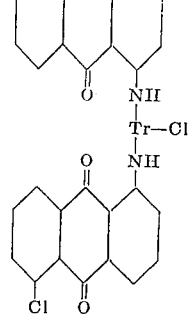 | 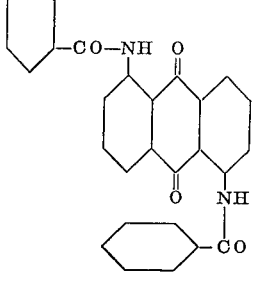 | Yellow. |
| 24 | 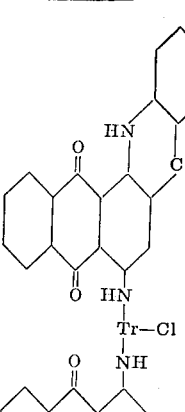 | 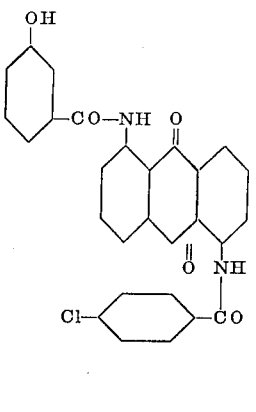 | Bluish green. |

EXAMPLE 25

5.3 parts of the monochlorotriazine product of the formula

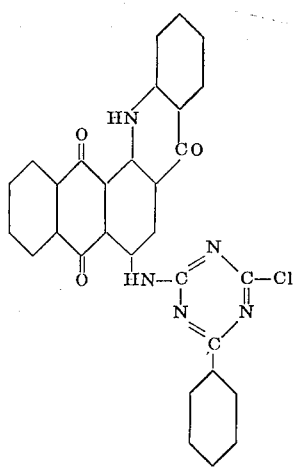

(manufactured by heating molecular amounts of 2-phenyl-4,6-dichloro-1,3,5-triazine with 2-amino-3,4-phthaloylacridone in N-methylpyrrolidone) and 4 parts of thiosalicyloylaminoanthraquinone are heated for 2 hours to the boil in 100 parts of nitrobenzene. The mixture is cooled to room temperature and the precipitated dyestuff of the formula

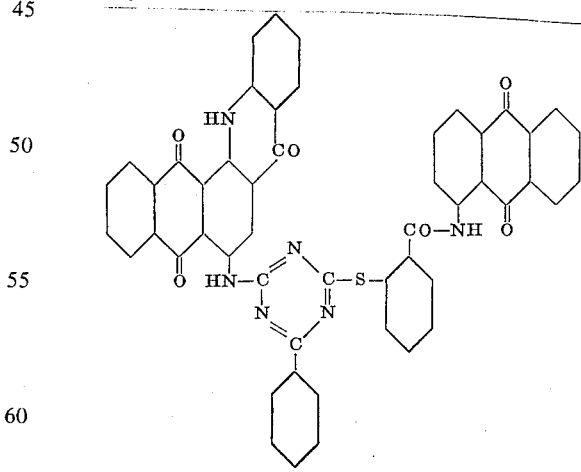

is isolated by filtration, washed with nitrobenzene and dried. It dyes cotton and regenerated cellulose in blue shades of very good fastness properties.

EXAMPLE 26

4.1 parts of the acetylation product of perylenetetracarboxylic acid-di-(p-aminophenyl-imide) and salicycloyl chloride of the formula

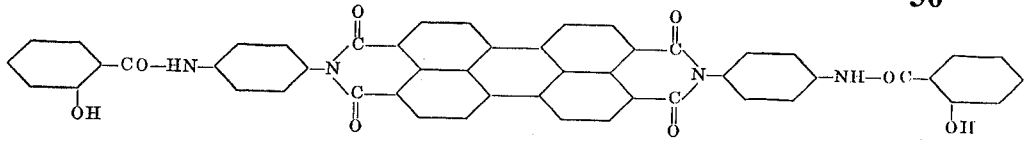

are refluxed for 14 hours with 8 parts of the monochlorotriazine product of 1 mole of cyanuric chloride and 2 moles of 1-amino-4-benzoylaminoanthraquinone in 150 parts of nitrobenzene with the addition of 0.1 part of pyridine and while passing in a flow of nitrogen. After the reaction mixture has cooled, the precipitated dyestuff of the formula 24 parts of 1-salicycloylamino-5-benzoylaminoanthraquinone and 31 parts of the condensation product of 1 mole of cyanuric chloride and 2 moles of 1-amino-4-methoxyanthraquinone are stirred for 6 hours at 145° to 150°C in 500 parts of dry nitrobenzene with the addition of 1.5 parts of pyridine and 5.5 parts of dust-free sodium carbonate. After the

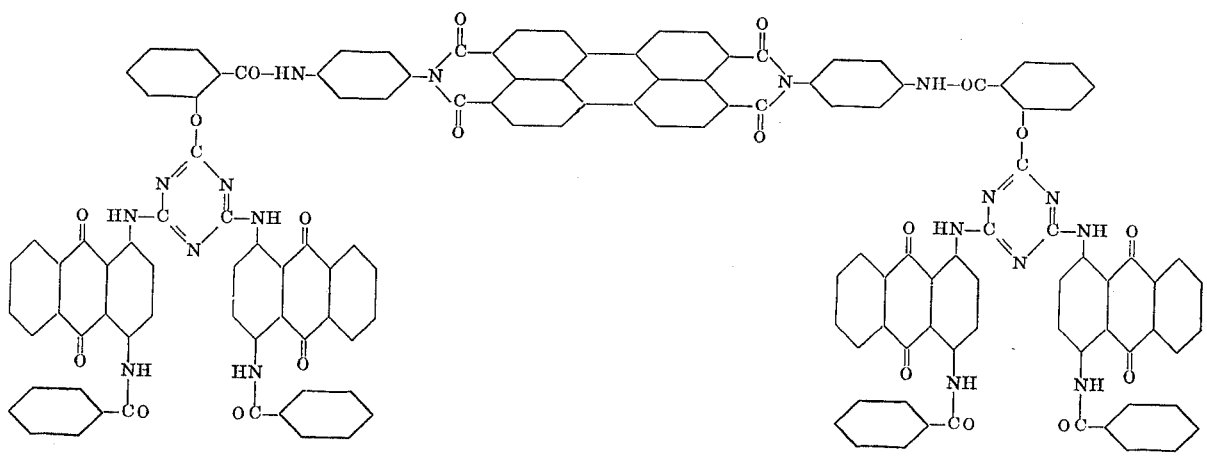

is isolated by filtration, washed with nitrobenzene, then with methanol, and dried in vacuo at 80°-100°C. It dyes cotton and regenerated cellulose in the conventional vat dyeing processes in bluish red shades of outstanding levelness and of very good fastness properties.

mixture has cooled to 40°C, the precipitated dyestuff is isolated by filtration, washed with nitrobenzene and then with methanol, and finally washed neutral with warm water of 50°C and dried in vacuo. The resulting orange dyestuff of the formula

EXAMPLE 27

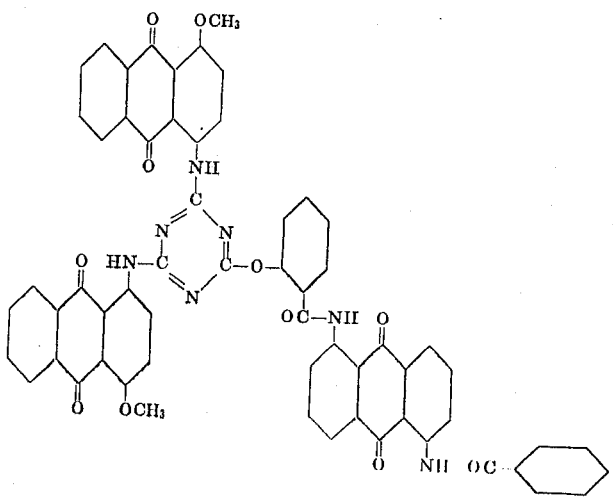

dyes cotton and regenerated cellulose in brilliant orange shades of excellent fastness and application properties. A dyestuff of similarly good properties is obtained by replacing the 24 parts of 1-salicyloylamino-5-benzoylaminoanthraquinone in this Example by 26 parts of 1-(2',3'-oxynaphoylamino)-5-benzoylaminoanthraquinone.

EXAMPLE 28

16 parts of chlorotriazine derivative (obtained from 1 mole of cyanuric chloride and 2 moles of 1-amino-5-benzoylaminoanthraquinone) and 3.6 parts of 1-(3',5'-dioxybenzoylamino)-anthraquinone are condensed under reflux for 16 hours in 150 parts of nitrobenzene with the addition of 0.2 part of pyridine and while passing in a flow of nitrogen. The dyestuff suspension is cooled to room temperature and then processed as described in Example 26. The resulting dyestuff of the formula dyes cotton and regenerated cellulose in golden yellow shades of very good fastness properties and excellent application properties.

The 1-(3',5'-dioxybenzoylamino)-anthraquinone used in this Example can be obtained in practically theoretical yield e.g. from the corresponding 1-(3',5'-diacetoxy) derivative by saponification of the acetoxy groups with 87 percent sulphuric acid at 5°–10°C.

According to the process of the invention it is possible to manufacture further dyestuffs from the starting materials listed in the following Table, the symbol $$-\underset{|}{Tr}-$$

representing the triazinyl radical, and the dyestuffs which have the shades indicated in the final column.

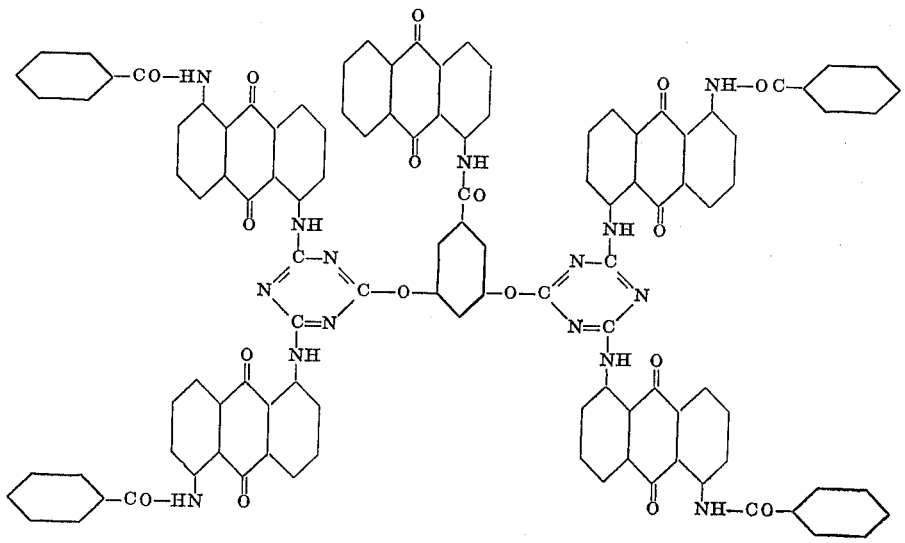

| Ex. | Reactive component | Hydroxy or mercapto compound | Shade |
|---|---|---|---|
| 29 | 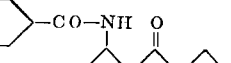 2 moles | 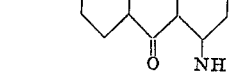 | Golden yellow |

—Continued

| Ex. | Reactive component | Hydroxy or mercapto compound | Shade |
|---|---|---|---|
| 30 | (structure, 2 moles) | (structure) | Olive. |
| 31 | (structure) | (structure, 2 moles) | Olive green. |
| 32 | (structure) | (structure, 2 moles) | Black. |
| 33 | (structure, 2 moles) | (structure) | Green. |

| Ex. | Reactive component | Hydroxy or mercapto compound | Shade |
|---|---|---|---|
| 34 | 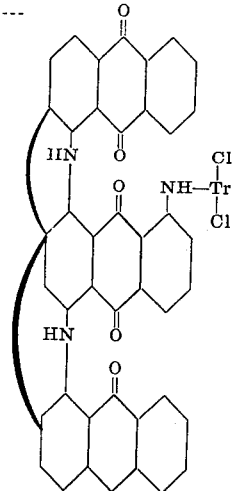 | 2 moles 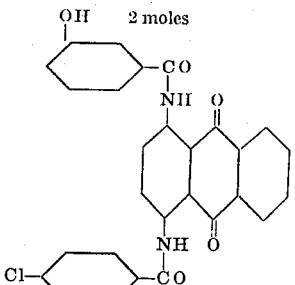 | Brown. |
| 35 | 2 moles 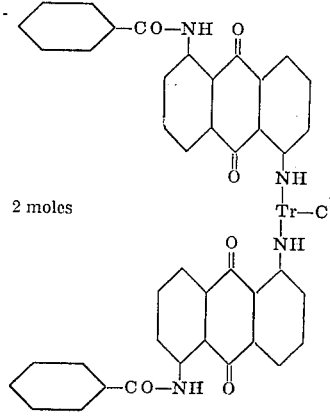 | 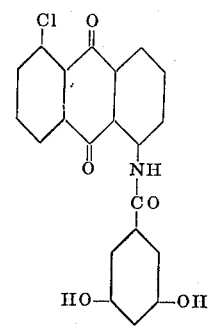 | Yellow. |
| 36 | 2 moles 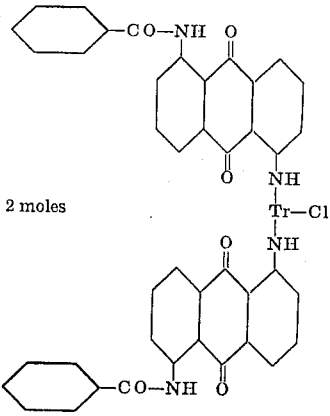 | 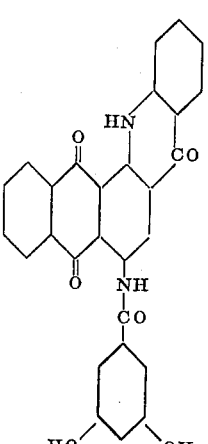 | Yellowish olive. |
| 37 | 2 moles 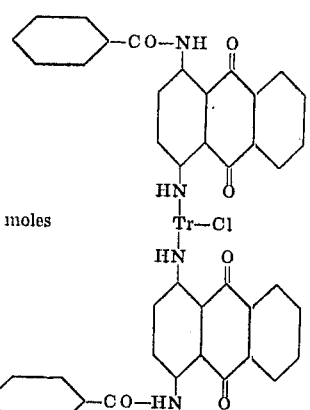 | 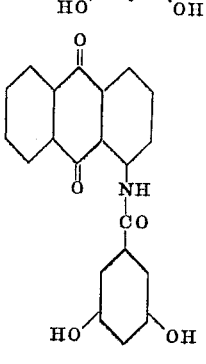 | Red. |

| Ex. | Reactive component | Hydroxy or mercapto compound | Shade |
|---|---|---|---|
| 38 | 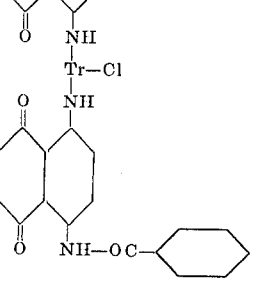 | 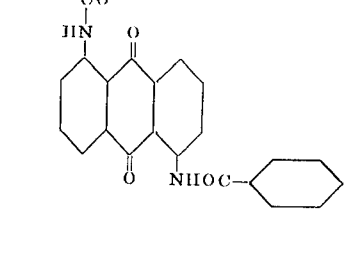 | Red. |
| 39 | 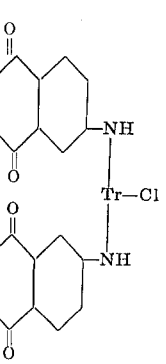 | 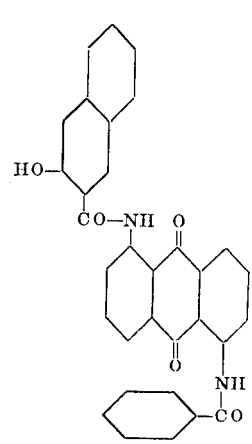 | Yellow. |
| 40 | 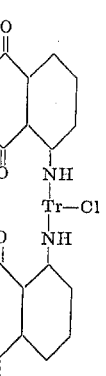 | 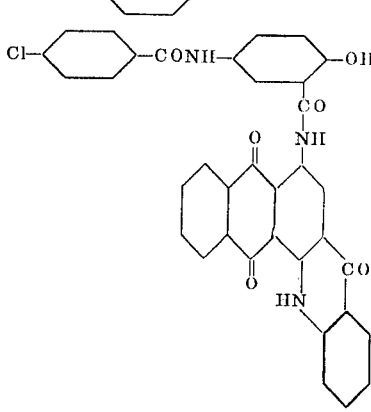 | Olive green. |
| 41 | 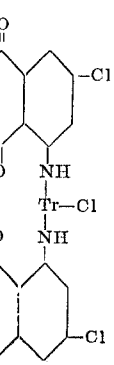 | 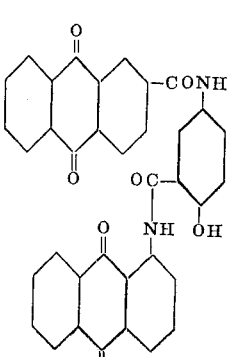 | Yellow. |

—Continued

| Ex. | Reactive component | Hydroxy or mercapto compound | Shade |
|---|---|---|---|
| 42 | 2 moles [structure] | [structure] | Bluish green. |
| 43 | [structure] | [structure] | Orange. |
| 44 | 2 moles [structure] | [structure] | Red. |
| 45 | [structure] | [structure] | Yellow. |

—Continued

| Ex. | Reactive component | Hydroxy or mercapto compound | Shade |
|---|---|---|---|
| 46 | (structure) | (structure) | Green. |
| 47 | (structure) | (structure) | Orange. |
| 48 | (structure) | (structure) | Olive. |
| 49 | (structure) | (structure) | Bluish-green. |

—Continued
| Example | Reactive Component | Hydroxy or Mercapto Compound | Shade |
|---|---|---|---|
| 50 | 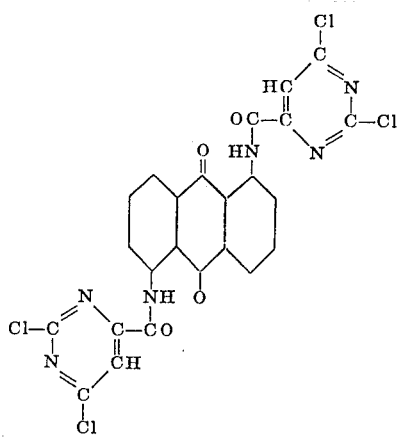 | 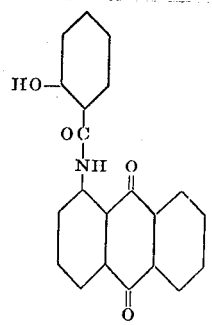 | Yellowish brown. |
| 51 | 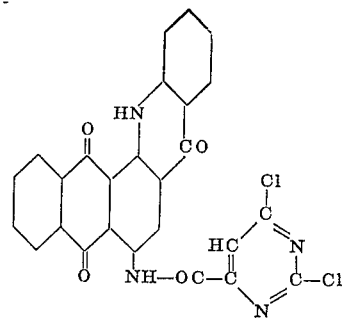 | 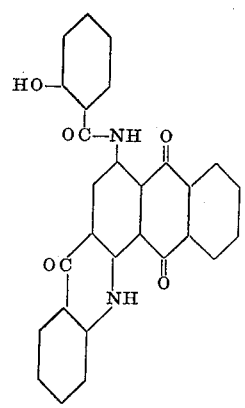 | Blue. |
| 52 | 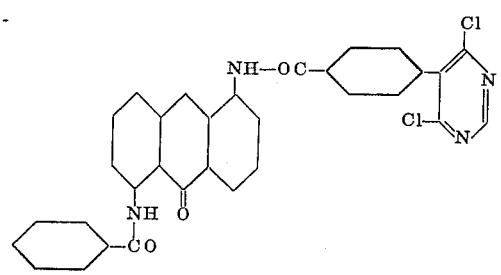 | 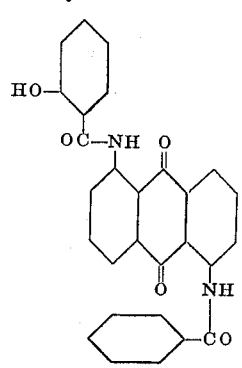 | Yellow. |
| 53 | 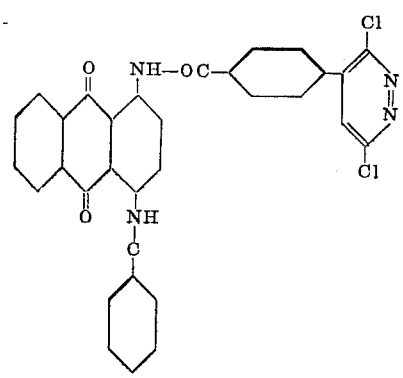 | 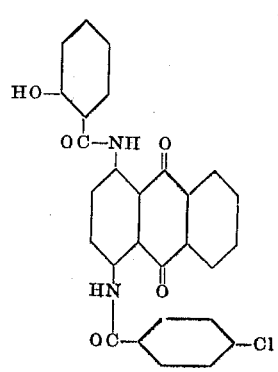 | Red. |

—Continued

| Example | Reactive Component | Hydroxy or Mercapto Compound | Shade |
|---|---|---|---|
| 54 | | | Blue. |
| 55 | | | Yellow. |
| 56 | 2 moles | | Do. |
| 57 | | | Orange. |

EXAMPLE 58

34 parts of 2-amino-3,4-phthaloylacridone are suspended in 300 parts of dry nitrobenzene. While stirring, a solution of 19 parts of cyanuric chloride in 100 parts of nitrobenzene is added to this suspension and the temperature is raised to 140°-145°C. After 3 hours the evolution of hydrogen chloride diminishes and only 25.2 parts of 5-amino-isothiazolanthrone are added and the temperature is raised to 190°-195°C. Vigorous evolution of hydrogen chloride again occurs and the suspension gradually turns greenish olive. After 3 hours it is cooled to 100°C and the asymmetrical monochlorotriazine product is isolated by filtration in the form of olive flakes. The product is washed with hot nitrobenzene, then with methanol and dried in vacuo at 110°C.

Analysis:
| | | | |
|---|---|---|---|
| theory: | N = 13.9% | found: | N = 13.6% |
| do. | S = 4.5% | do. | S = 4.8% |
| do. | Cl = 5.0% | do. | Cl = 5.2% |

7 parts of this monochlorotriazine derivatives are suspended in 100 parts of nitrobenzene, the suspension is treated with 3.5 parts of 1-salicycloylaminoanthraquinone and 0.1 part of pyridine and heated under reflux for 10 hours. After the batch has cooled, the dyestuff of the formula

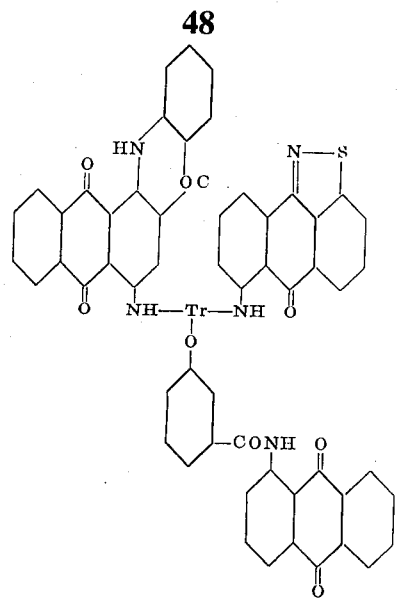

is isolated by filtration, washed with nitrobenzene, then with methanol and dried in vacuo at 100°C.

The resulting dyestuff dyes cotton and regenerated cellulose in full, olive shades of very good fastness and application properties.

Further asymmetrical dyestuffs with 3 different vattable enthraquinoid radicals can be manufactured from the starting materials listed in the following Table in the manner according to the invention.

| Example | Reactive component | Hydroxy or mercapto compound | Shade |
|---|---|---|---|
| 59 | (structure with Tr—Cl) | (structure with OH) | Deep purplish red. |
| 60 | (structure with Tr—Cl) | (structure with OH) | Reddish brown. |

-Continued
| Example | Reactive component | Hydroxy or mercapto compound | Shade |
|---|---|---|---|
| 61 | 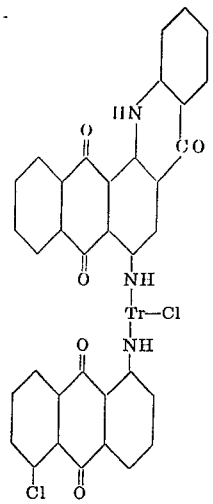 | 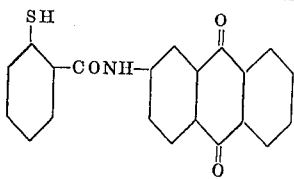 | Olive. |
| 62 | 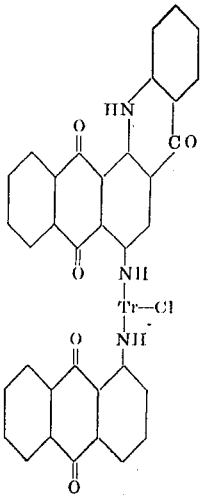 | 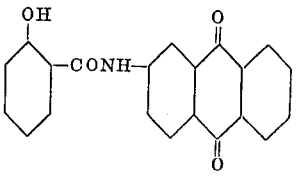 | Green. |
| 63 | 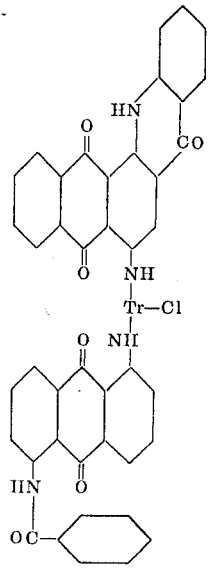 | 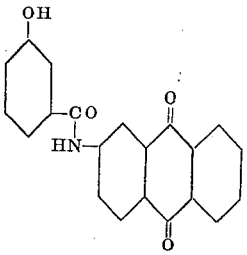 | Yellowish green. |

| Example | Reactive component | Hydroxy or mercapto compound | Shade |
|---|---|---|---|
| 64 | | | Bluish green. |
| 65 | | | Greenish yellow. |

Textile Dyeing

1 Part of dyestuff is vatted at 50°–70°C with 10 parts by volume of sodium hydroxide having a specific gravity of 36° Be and 5 parts of sodium hydrosulphite in 200 parts of water. The above stock vat is added to a dyebath which contains in 2,000 parts of water 5 parts by volume of sodium hydroxide solution with a specific gravity of 36°Be and 3.7 parts of sodium hydrosulphite. 100 parts of cotton are put into this dyebath a 40°C. After 10 minutes, 15 parts of sodium chloride are added and after 20 minutes, a further 15 parts and dyeing is carried out for 45 minutes at 40°C. The cotton is then squeezed out, oxidised, and finished in the conventional manner.

Pigment coloration

5 Parts of the dyestuff mentioned in Example 20 are mixed with 95 parts of dioctyl phthalate and ground in a ball mill until the dyestuff particles are smaller than 3μ. 0.8 Part of this dioctyl phthalate paste is mixed with 13 parts of polyvinyl chloride, 7 parts of dioctyl phthalate and 0.1 part of cadmium stearate, and this mixture is then rolled to and fro for 5 minutes in a twin roller mill at 140°C.

A yellow coloured material with good migration properties and good fastness to light is obtained.

Materials with similarly good migration and light fastness properties are also obtained by using instead of the above dyestuff the reaction products of Example 28, 34, 41 or 45.

Coloration of lacquers

40 Parts of a nitrocellulose lacquers, 2.375 parts of titanium dioxide and 0.125 part of the dyestuff of Example 3 were ground in a rod mill for 16 hours. The resulting lacquer is applied in a thin layer to aluminium foil. It gives a blue coloration having excellent fastness to light. Orange or red colorations with similarly good light fastness properties are obtained by using the dyestuffs according to Example 27 or 37.

We claim:

1. A vat dyestuff of the formula

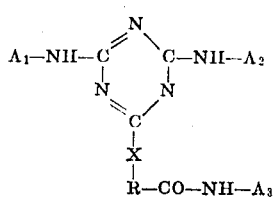

in which $A_1$ and $A_2$ are independently anthraquinone, phthaloylacridone or thiazoleanthrone, optionally substituted by methoxy, chloro and benzoylamino, X is —O— or —S—, R is benzene, naphthalene or anthracene, optionally substituted by chloro, hydroxy, methyl, chlorobenzoylamino, dichlorobenzoylamino and anthraquinonylcarbonylamino, and $A_3$ is anthraquinone, phthaloylacridone, thiazoleanthrone or anthrapyrimidine, optionally substituted by chloro, phenylamino, phenylthio, benzoylamino, chlorobenzoylamino and hydroxybenzoylamino, and in which the radical R is bound in ortho- or meta-position.

2. A vat dyestuff as claimed in claim 1, in which $A_1$ and $A_2$ each is anthraquinonyl-(1), optionally substituted by methoxy and benzoylamino, R is benzene or naphthalene and $A_3$ is anthraquinonyl-(1'1) or anthraquinonyl-(2), optionally substituted by benzoylamino.
3. The vat dyestuff as claimed in claim 2 of the formula
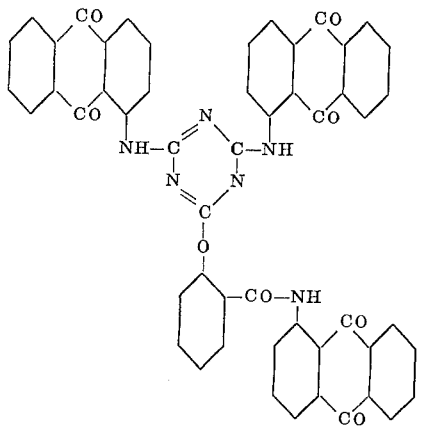
4. The vat dyestuff as claimed in claim 2 of the formula
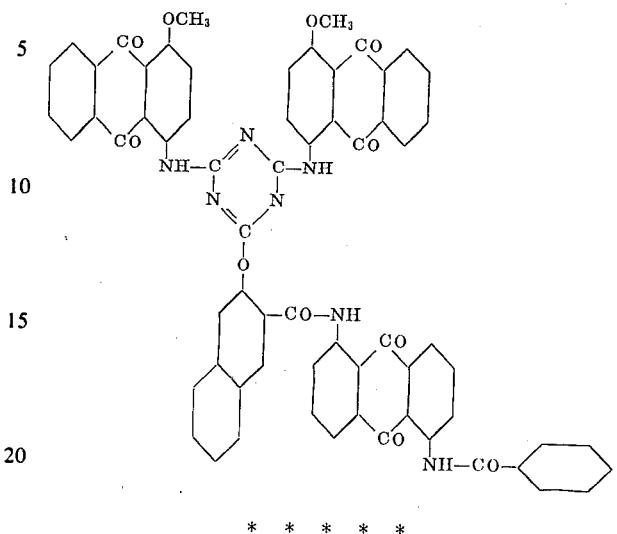
* * * * *